Aug. 4, 1925.  1,548,702

R. BALSAN
PROCESS FOR SEPARATING MUD AND FATTY MATTERS CONTAINED IN WATER,
MORE ESPECIALLY APPLICABLE TO WOOL SCOURING LIQUORS
Filed May 23, 1922

Patented Aug. 4, 1925.

1,548,702

UNITED STATES PATENT OFFICE.

ROBERT BALSAN, OF PARIS, FRANCE.

PROCESS FOR SEPARATING MUD AND FATTY MATTERS CONTAINED IN WATER, MORE ESPECIALLY APPLICABLE TO WOOL-SCOURING LIQUORS.

Application filed May 23, 1922. Serial No. 563,177.

*To all whom it may concern:*

Be it known that I, ROBERT BALSAN, a citizen of the French Republic, and a resident of Paris, France, have invented new and useful Improvements in a Process for Separating Mud and Fatty Matters Contained in Water, More Especially Applicable to Wool-Scouring Liquors, of which the following is a specification.

Present methods for separating fatty matters contained in wool-washing or scouring liquors, by treating these liquors by centrifugal extraction in an ordinary turbine or hydro-extractor, present the disadvantage that the mud or dirt obstructs the orifices for the passage of liquid from the drums of the extractors, and necessitate frequent cleaning, which prevents continuous working.

In order to obviate this disadvantage it has been attempted as a preliminary measure to separate the mud or dirt by decantation, so as to effect the centrifugal extraction of the liquors only after clarifying, but this preliminary decantation is slow and insufficient and it reduces considerably the yield of the process, because the mud in settling takes with it the greater part of the particles of fat suspended in the water.

It is known to suddenly separate the mud from the liquors containing the fats, by centrifugal action for example in an extractor with solid drum; the particles of the mud, by reason of their density being greater than that of the fatty particles, separate rapidly from the waters in such a way that the latter are obtained in a clarified state and containing the greater part of the fats, which can then be recovered by ordinary methods.

According to the present invention, the scouring waters freed from mud, are returned into the wool-scouring troughs in order to increase their concentration of fatty matter.

In order to carry out the process in accordance with this invention, there will be used a hydro-extractor or turbine with solid drum or tray, into which the water to be freed from dirt is delivered, and from which the clarified liquid can be discharged by any suitable suction device.

The drawing represents schematically by way of example an apparatus for carrying out the process according to the invention.

Figure 1:
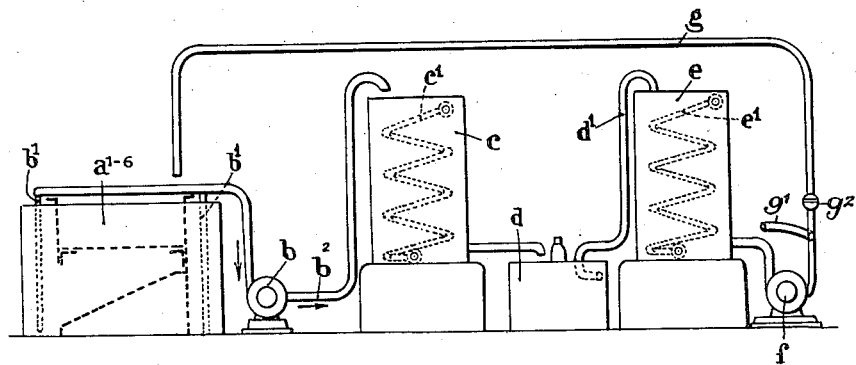
Fig. 1 is a view in lateral elevation of one form of the apparatus.
Figure 2:
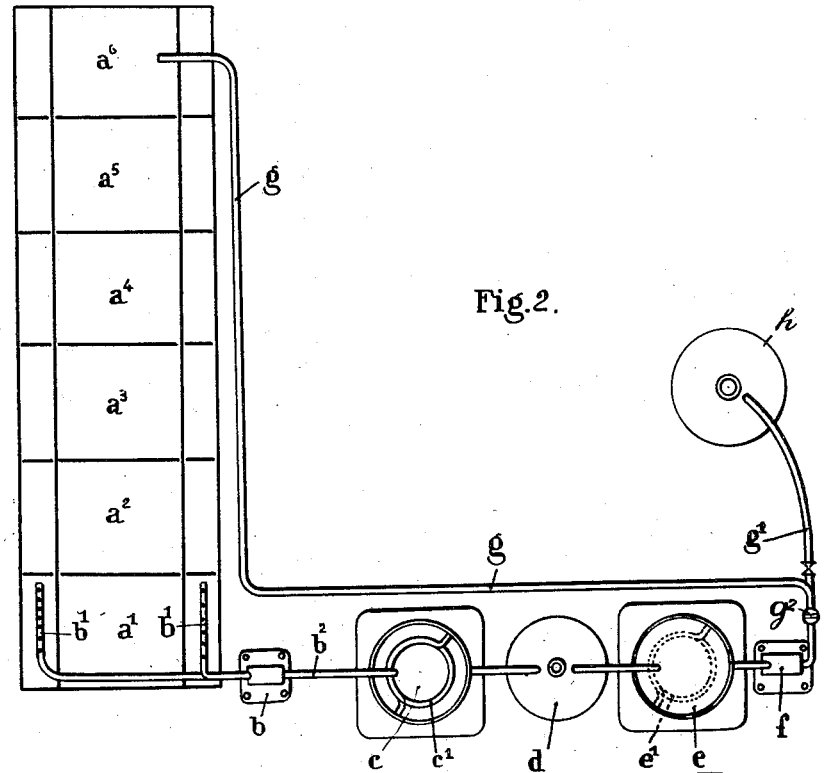
Fig. 2 is a plan view of the apparatus.

The wool to be washed is led through a battery of six vats $a^1$—$a^6$, while the wool scouring liquor contained therein is led in a reverse direction to these vats $a^6$—$a^1$ whereby to accomplish a washing of the wool by the countercurrent principle, the most concentrated scouring liquor always being situated in the vat $a^1$.

As soon as the mud commences to accumulate in vat $a^1$ the muddy scouring liquor is drawn through perforated conduits $b^1$ by the pump $b$ and led by the conduit $b^2$ into a reservoir $c$ where it is heated by a coil $c^1$. From here it passes into a separating centrifugal machine $d$ having a solid pan which retains almost all of the mud. The scouring liquor freed from mud is forced through conduit $d^1$, under the action of centrifugal force due to the operation of the centrifugal machine $d$, into the reservoir $e$, having a heating coil $e^1$. From this reservoir, the heated liquor, containing the greasy materials, is returned by the pump $f$, by means of conduit $g$, into the washing vats where the concentration of grease may be continued up to the point where it is judged sufficient for recovery of the grease, and separation may be effected in any known manner. A branch $g^1$ connecting with the conduit $g$ permits sending the concentrated liquor relieved of its mud, into the centrifugal machine $h$ where the greasy materials may be extracted; a valve or the like $g^2$ placed in the conduit $g$ beyond the branch $g^1$, permits shutting off this conduit $g$ when the greasy materials are to be removed from the centrifugal machine $h$.

This process presents, in addition to the advantage that it can be arranged to operate continuously, the following further advantages:

(a) considerable increase in the yield of fat by reason of the fact that the mud, separated suddenly from the water, takes with it little or no fat, whereas with the known processes of separation, a large proportion of the fat was taken;

(b) easier recovery of the fats from the liquors because the latter are very clear and no longer contain mud likely to obstruct the fat-discharge passages;

(c) improvement in the quality of the fats because the latter being suddenly separated from the waters, do not suffer from fermentation, which may occur rapidly and pollute the emulsified fats;

(d) possible re-utilization of the washing liquors, after they have been freed from the emulsified fats.

It will be understood that the invention is applicable not only to wool-scouring liquors but also to all liquids charged with mud or dirt and containing fats in suspension.

What I claim is:

A process for separating water, mud and fatty matters contained in wool scouring liquors, comprising suddenly separating the mud from the liquors charged with fat, re-using the clarified liquors for wool scouring at least once, to increase the concentration of fatty matters, again separating out the mud, and then treating the said liquor to recover the fats therefrom.

In testimony whereof I have signed my name to this specification.

ROBERT BALSAN

Witnesses:
J. ARMENGAUD, AIMÉ,
U. DEFÉXRIMOND.